Oct. 27, 1970   F. R. HOLT   3,536,997
DIGITAL OHMMETER WITH MODIFIED WHEATSTONE BRIDGE
Filed Oct. 11, 1968   4 Sheets-Sheet 1
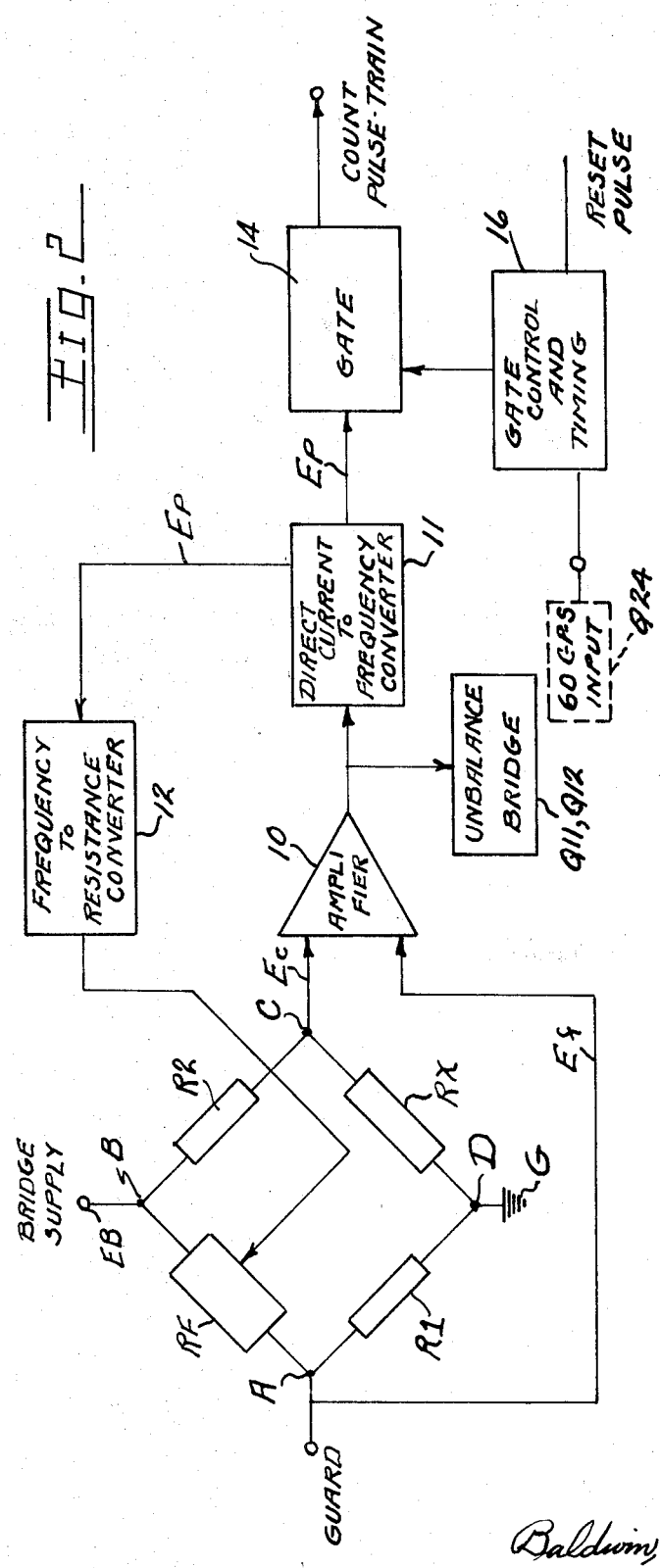
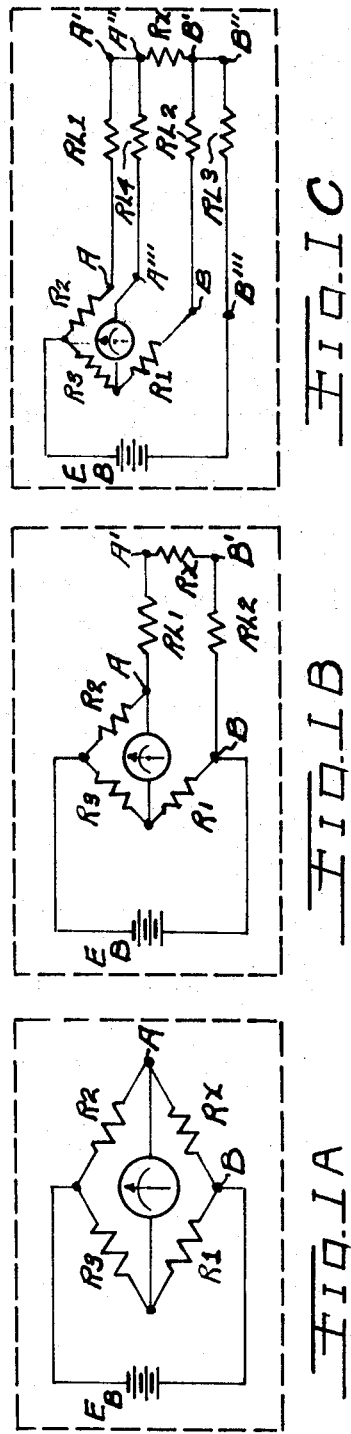
INVENTOR.
FREDERICK R. HOLT
BY
Baldwin, Egan, Walling & Fetzer
ATTORNEYS

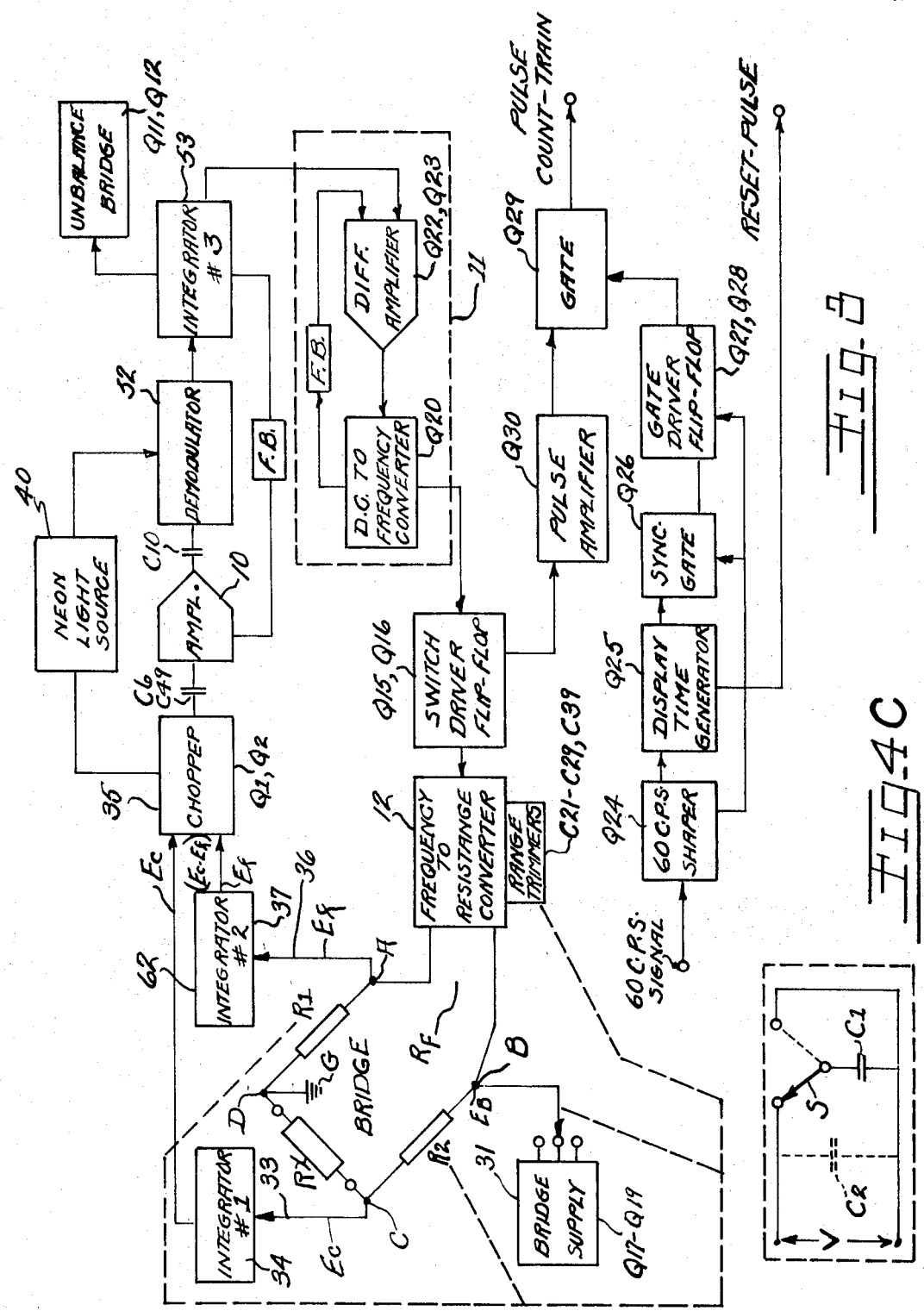

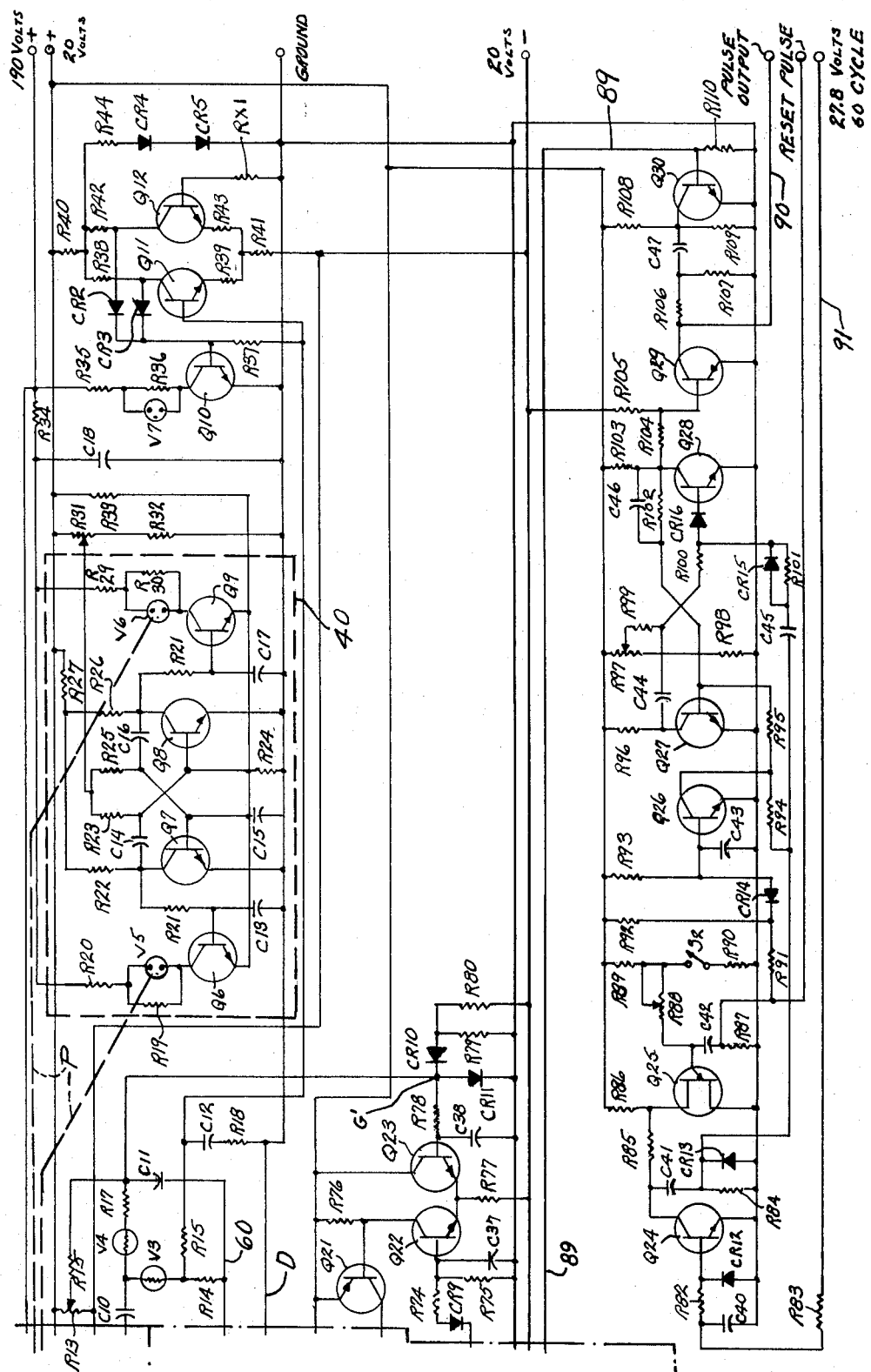

United States Patent Office 3,536,997
Patented Oct. 27, 1970

1

3,536,997
DIGITAL OHMMETER WITH MODIFIED WHEATSTONE BRIDGE
Frederick Rodney Holt, East Cleveland, Ohio, assignor to The Hickok Electrical Instrument Company, Cleveland, Ohio, a corporation of Ohio
Filed Oct. 11, 1968, Ser. No. 766,909
Int. Cl. G01r 27/02, 17/06
U.S. Cl. 324—62                              7 Claims

ABSTRACT OF THE DISCLOSURE

The digital ohmmeter instrument converts a direct current signal representating a resistance value $R_x$ into a burst of pulses wherein the number of pulses in the burst is precisely equal to the magnitude of the resistance under test. The configuration of instrument circuitry illustrated herein to disclose the present invention is capable of digitally measuring the value of resistance with the range of 0–999 megohms in ten ranges.

---

The magnitude of the resistance $R_x$ under test determines the number of pulses in the burst, with the duration of the burst remaining constant with respect to internal timing circuits. The pulse burst is applied to a digital counter and display instrument wherein it is counted and visually displayed. Each pulse burst is preceded by a reset pulse which resets the display instrument and assures that the count of pulses in each burst starts from zero. The visually displayed total count may also be retained for a predetermined period of time to permit sufficient time for visual monitoring and recording.

The direct current signal input to the instrument is a direct current voltage identified as $E_c$. A voltage identified as $E_f$ is a direct current feedback voltage generated by the instrument and which is of the same polarity as $E_c$, and applied to the instrument input in opposition to voltage $E_c$ to provide a difference voltage therebetween. The difference voltage $(E_c-E_f)$ is amplified, inverted, and applied to the input of a direct current-to-frequency converter. This circuit generates a pulse train whose frequency is approximately proportional to the voltage applied to it. This pulse train is used to activate a highly precise frequency-to-direct current converter. The direct current output voltage of the frequency-to-direct current converter is voltage $E_f$ and is proportional to the product of a standard voltage source and the frequency of the pulse train within about ±0.01%. By making the gain of the direct current difference amplifier very high, voltage $E_f$ will be very nearly equal to voltage $E_c$ and consequently, the frequency of the pulse train will be held proportional to $E_c$ to within a few parts in ten thousand.

The heart of the resistance measuring circuit of the present invention is a modified automatically balancing Wheatstone bridge, where $R_1$ and $R_2$ are the fixed constants or ratio arms of the bridge, and $R_f$ is equivalent to and represents what is normally the third constant or balance arm in a Wheatstone bridge. The equivalent resiistance of $R_f$ and the value of the resistance under test depends on the frequency of the DC-to-frequency converter. Equivalent resistance $R_f$ is adjusted automatically until the Wheatstone bridge reaches balance whereat the number of pulses in the signal burst from said converter is exactly the value of resistance $R_x$ as adjusted by the range constant K of the instrument.

This invention relates generally to a digital type of measuring instrument and more particularly to a digital instrument especially designed to directly measure the value of resistance.

This digital measurement is accomplished by producing a direct current voltage that is proportional to the value of the resistance under test which voltage is applied to and converted in the instrument circuitry into a burst of pulses wherein the number of pulses in the burst is precisely proportional to the magnitude of the resistance multiplied by a constant K.

The constant K is a function of the instrument range selected and is adjustable such that the number of pulses produced is equal to 1000 at full range for each range of the instrument. A change in the magnitude of resistance under test changes the number of pulses in the burst but not the duration of said burst.

As merely one application the electronic circuit of the present invention is particularly applicable for use with the digital counter and readout unit commercially known as the Hickok Model DMS-3200 main frame which is manufactured by The Hickok Electrical Instrument Company of Cleveland, Ohio.

When used with this counter and readout unit or equivalent, the electronic circuit of the present invention is operable to convert a direct current voltage representing the magnitude of the resistance under test into a pulse train or burst wherein the number of pulses in the burst is precisely equal to the magnitude of the unknown resistance. This pulse burst is then applied to the digital counter and readout device which counts the number of pulses and visually displays the numeral summation thereof thus giving a highly accurate visual display of the actual value of magnitude of the resistance under test.

In its present day use, the instant electronic circuit as incorporated into a digital resistance test instrument is capable of providing a digital measurement of resistance within an accuracy of approximately 0.1%.

It is therefore a primary object of the present invention to provide an electronic digital instrument circuit capable of directly measuring the value of resistance.

Another object of the present invention is to provide an electronic instrument circuit especially designed to convert a direct current voltage representing the magnitude of a resistance under test into a burst of pulses wherein the number of pulses in the burst is precisely equal to the magnitude of the resistance.

Still another object of the present invention is to provide an electronic instrument circuit which is especially designed to provide an output digital signal that is precisely equal to the magnitude of a resistance under test and which circuit includes a direct current-to-frequency converter that generates a pulse train whose frequency is approximately proportional to the magnitude of voltage applied thereto, a highly precise frequency-to-resistance converter coupled to said direct current-to-frequency converter and whose output is proportional to the product of a predetermined reference voltage and the frequency of the signal applied thereto, a difference amplifier which is coupled to the resistance under test and the output of the frequency-to-resistance converter; the gain of the amplifier being relatively high and coupled to said direct current-to-frequency converter whereby the output of the frequency-to-direct current converter is a value that, within very precise limits, is very nearly equal to the magnitude of the resistance under test.

Other objects and advantages of the electronic digital circuit of the present invention will be apparent to one skilled in the art to which it pertains and upon reference to the following description of a preferred embodiment thereof and which is illustrated in the accompanying drawings wherein:

FIG. 1A is a simplified schematic of a conventional Wheatstone bridge;

FIG. 1B is a schematic of a conventional Wheatstone bridge and which illustrates the resistance of the leads or conductors which connects the unknown resistance $R_x$ to the bridge;

FIG. 1C is a schematic of the four terminal modified Wheatstone bridge which is utilized in the digital ohmmeter instrument of the present invention;

FIG. 2 is a simplified schematic diagram of the digital ormmeter instrument of the present invention;

FIG. 3 is a complete schematic diagram of the instant digital ohmmeter instrument; and FIGS. 4A–4B are schematic wiring diagrams of the complete digital ohmmeter instrument.

Figure 4A:
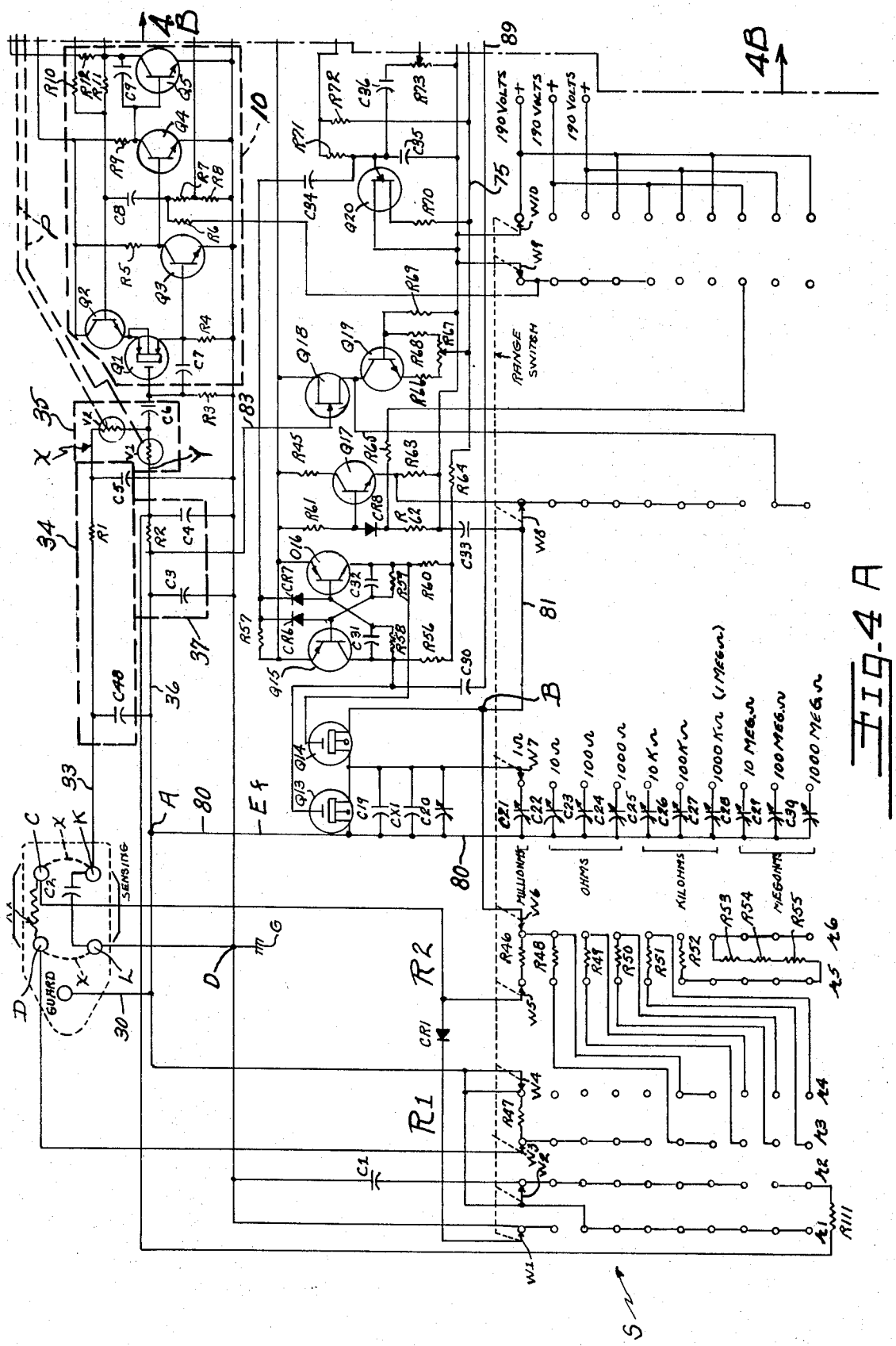

As noted herein, this digital ohmeter instrument utilizes a modified Wheatstone bridge that may also be referred to as a "four terminal" bridge, and in which the "balance arm" includes an automatically balancing direct current-to-frequency converter capable of providing a signal burst which—at bridge balance—is representative of the value of the unknown resistance under test.

With reference now directed to FIG. 1A wherein is illustrated a conventional Wheatstone bridge, the value of the unknown resistor under test $R_x$ is calculated by the formula $$R_x = R_2 \left(\frac{R_1}{R_3}\right)$$

when the bridge is in balance.

Resistors $R_1$ and $R_2$ are commonly referred to as the "ratio arms" of the bridge and $R_3$ the "balance arm."

If the resistor $R_x$ under test is remote from the bridge as depicted in FIG. 1B whereby it is connected to terminals A and B by leads identified by their resistance values $RL_1$, $RL_2$, the measured value of the resistance $R_x$ is actually $R_x + RL_1 + RL_2$. Also, contact resistance may occur at terminals A, A', B, B' and are included in the calculated value of $R_x$.

By removing resistance $R_x$ and shorting terminals A' to B' the resistance of the connecting leads can be determined which will allow a fairly accurate measurement of $R_x$ to be made, except for the variations in contact resistance which may occur at points A' and B'. When terminal A' is shorted to B', only 3 points of contact resistance are present A, A'B', and B, whereas when $R_x$ is present and connected across terminals A', B' four terminals are utilized.

The basic Wheatstone bridge of FIGS. 1A and 1B can be modified so that these problems are minimized. With reference directed to FIG. 1C first, note that a resistor $RL_3$ is in series with the bridge voltage source $E_B$ and has no effect upon bridge accuracy.

Also, note in FIG. 1C that lead resistance $RL_2$ is in series with bridge resistance $R_1$ instead of being in series with the unknown resistance $R_x$. If bridge resistance $R_1$ is made much larger than the unknown resistance $R_x$, the effect of adding lead resistance $RL_2$ to resistance $R_1$ is much less than adding said resistance $RL_2$ to resistance $R_x$. As will be hereinafter apparent the ohmmeter instrument of the present invention is designed so that this is the case. Normally, bridge resistance $R_1$ is 30 to 300 times larger than the unknown resistance $R_x$ on the instrument ranges where lead and contact resistance may have a material affect on bridge accuracy. Therefore, the percentage error introduced by lead resistance $RL_2$ is reduced by a factor of 30 to 300 times for full scale values of $R_x$, and much better proportional accuracy is obtained for lower values of resistance $R_x$ under test. Also, inasmuch as resistance $RL_3$ does not affect the accuracy of the bridge, the effect of variation in contact resistance at terminal B has also been reduced by the same factors as $RL_2$.

Secondly, the null detector N has a virtually infinite impedance, so that a resistor $RL_4$ in series with it will have little or no effect on the accuracy of the bridge.

And, inasmuch as $RL_4$ has no effect, and lead resistance $RL_1$ is in series with bridge resistance $R_2$, the ohmmeter instrument is especially designed so that bridge resistor $R_2$ is much larger than resistor $R_x$ under test with the subsequent reduction in the effect of lead resistance $RL_1$ being a minimum of 100:1.

To complete the transformation of the ordinary Wheatstone bridge into a four terminal bridge, the instant ohmmeter instrument is designed to best arrange the terminal or contact resistances so that any errors introduced thereby will be minimized. To accomplish this and as shown in FIG. 1C the contact or terminal resistance errors at A, A', B, B' are reduced in the same manner as the respective lead resistances $RL_1$, $RL_2$.

As also seen in FIG. 1C, contact resistances at A'', A''', B'', B''' likewise have little or no effect on bridge accuracy. The four terminals A, A''', B, B''' are the four terminals provided on the instant ohmmeter instrument to define the "four terminal" bridge.

With this assembly, if terminal A is connected conductively to A''', and terminal B is connected to terminal B''', the form of the bridge is reverted to that of FIG. 1B. In general with this form the effect of lead and contact resistances at terminals A'', A''' and B'', B''' in the bridge circuit have negligible effect, whereas the lead and contact resistances in the terminals A, A', B, B' have an effect although to a greatly reduced extent.

With reference now directed to the simplified schematic diagram of the instant ohmmeter instrument as shown in FIG. 2, it is seen to include the modified Wheatstone bridge just discussed comprising ratio arm resistors identified diagrammatically at $R_1$, $R_2$, a balance arm identified by the equivalent resistance $R_f$ and which is connected across bridge terminals A, B as to be connected between ratio arm resistors $R_1$, $R_2$.

The unknown resistance $R_x$ under test is connected across terminals C, D and hence across ratio resistors $R_1$ and $R_2$.

The bridge power supply $E_B$ is connected across terminals B and D, the latter also being illustrated as instrument ground.

The voltage appearing across the unknown resistors $R_x$ (terminals C and D) which is identified as $E_c$ is applied to the input of amplifier 10.

The balance arm of the bridge as above noted, is schematically identified in FIG. 2 as an equivalent resistance $R_f$. This resistance $R_f$ depends upon the direct current-to-frequency converter identified at 11 which, as will be hereinafter explained in detail, generates a pulse burst having a number of pulses therein depending upon the voltage applied to its input.

The pulse burst output of the direct current-to-frequency converter 11 is applied to the input of the frequency-to-resistance converter identified at 12 which generates a direct current signal that is applied across bridge terminals A, B. The voltage developed at bridge terminal A identified as $E_f$ is of the same polarity as voltage $E_c$ and is applied to the input of the amplifier 10 in opposition to said voltage $E_c$.

The difference voltage $E_c - E_f$ applied to the amplifier 10 is amplified, inverted and then applied to the direct current-to-frequency converter 11 which generates a sawtooth pulse burst $E_p$, the frequency of which is approximately proportional to the input voltage applied to it.

The gain of the system is purposely made high as for example $3 \times 10^4$ ($E_c - E_f$) whereby voltage $E_f$ is very nearly equal to voltage $E_c$. The frequency of the pulse burst $E_p$ is thus held proportional to voltage $E_c$ within a few parts in ten thousand.

The pulse burst output $E_p$ of converter 11 is then applied to a precisely controlled gate 14 which passes the same for an exact period of time to the count and display instrument as aforedescribed, such as the Hickok Model DMS–3200 main frame, where the pulses in the burst are counted and displayed.

With the bridge at balance, the number of pulses in the pulse burst represents the magnitude of the resistance $R_x$ under test.

The duration of time which the gate 14 operates to pass the pulse burst $E_p$ is regulated by the gate control and timing circuit as identified at 16. This control and timing circuit is precisely operated to control the width of the pulse burst to 100 milliseconds. A change in the value of the resistance under test will change the number of pulses in the burst but the duration of the burst (100 ms.) remains the same.

The gate control and timing circuit 16 also generates a reset pulse which precedes the pulse burst to the counter and display instrument and which is operable to reset said instrument to zero and thus assure that the next pulse count will start from zero. This circuit 16 may also be operable to retain the pulse count on the counter and display instrument for an indefinite period to enable for subsequent recording thereof.

With reference now directed to the complete circuit block diagram of the ohmmeter instrument as shown in FIG. 3, and its associated circuit schematic as shown in FIGS. 4A, 4B, the unknown resistance $R_x$ to be measured is connected across terminals C, D so as to connect between ratio arm resistors $R_1$ and $R_2$.

As best seen in FIG. 4A, ratio arm resistors $R_1$ and $R_2$ each comprise a bank of resistors of varying magnitude which are selectively manually switched into the bridge by switch S.

Switch S in the embodiment illustrated is seen to have six rows ($r_1$—$r_6$) of spaced terminals, each row being associated with a movable contact or wiper arm $w_1$—$w_6$ respectively.

In the switch position shown, wiper contacts $w_3$ and $w_4$ are each engaged with the uppermost terminal in rows $r_3$ and $r_4$ whereby resistor R47 is connected across bridge terminals D, A to define ratio arm $R_1$ for said bridge.

In like manner, wiper contacts $w_5$ and $w_6$ are connected across resistor R46 to connect said resistor across bridge terminals C, B whereby it defines bridge ratio arm $R_2$.

Resistor R47 preferably has a value of 300 ohms±0.5% whereas resistor R46 has a value of 99.5 ohms±0.5% for the lowest range for the instrument which is 0 to 999 milliohms.

As shown in FIG. 4A switch S has ten positions, disposed for illustration in vertical relation, the uppermost position as just described being identified as the milliohm range, full range being 1 ohm; the next three positions the "ohm" ranges, 10 ohms, 100 ohms and 1000 ohms full range respectively; the next three positions the "kilohm" ranges, 10 K ohm, 100 K ohm and 1000 K ohm or 1 megohm full range respectively; and the next three positions the "megohm" ranges, 10 megohm, 100 megohm and 1000 megohm full range respectively.

As also seen in FIG. 4A, in the 10 ohm to and including 10 K ohm ranges resistor R47 is used as the bridge resistance in ratio arm $R_1$, whereas resistor R48 is used as bridge resistance $R_2$ in the 10 ohm range; R49 as resistance $R_2$ in the 100 ohm range; R50 as resistance $R_2$ in the 1000 ohm range and R51 in the 10 kilohm range.

In the 100 kilohm and 1 megohm ranges, resistor R48 is used as bridge resistance $R_1$, whereas resistor R52 is used as resistance $R_2$ in the 100 kilohm range and the combination of R52, R53, R54 and R55 are used as bridge resistance $R_2$ in the 1 megohm through 1000 megohm ranges. Likewise, resistors R49, R50 and R51 are used as bridge resistance $R_1$ in the 10 megohm, 100 megohm and 1000 megohm ranges, respectively.

As is also shown in FIG. 4A, conductive straps or shorting bars X may be connected across bridge terminal C and terminal K, and across bridge terminal D and terminal L which in turn connects to the instrument ground G.

A "guard" terminal is also shown in FIG. 4A connecting by conductor 30 to wiper contact $w_4$ and to bridge terminal A which as will be explained hereinafter in detail, the purpose of which is to prevent leakage currents from affecting the accuracy of the bridge.

A source of energy identified at 31 is connected to the bridge at bridge terminals B and D (instrument ground).

A voltage output from said bridge, identified as $E_c$ is taken from bridge terminal C and connected by conductor 33 to the input of an integrator circuit identified at 34 and comprising $\pi$ connected resistor $R_1$ and capacitors C5 and C48. Voltage $E_c$ is thereby integrated and applied as one input of chopper circuit 35 as indicated at point X.

Voltage $E_c$ is the voltage drop across the unknown resistance under test $R_x$.

A second voltage generated in the frequency-to-resistance converter 12 is applied across bridge terminals B, A and is effective to provide a feedback voltage $E_f$ which is the same polarity as voltage $E_c$ and which is connected by conductor 36 to the input of integrator circuit 37 comprising $\pi$ connected resistor $R_2$ and capacitors C3 and C4.

Voltage $E_f$ is thereby integrated and applied as a second input to said chopper circuit 35 at point Y.

As will be hereinafter better understood, the frequency-to-resistance converter 12 consists basically of a single pole double pole electronic switch which alternately charges and discharges a capacitor at a predetermined rate. As aforementioned, the converter 12 is connected into the bridge as the "balance arm" and represents an equivalent resistance $R_f$.

The equivalent resistance $R_f$ as will later be better understood is governed by the relationship $R_f = 1/Cxf$ where C is a constant and $f$ is a value of frequency. In the operation of the bridge herein, the equivalent resistance $R_f$ automatically adjusts in value as well as the direct current-to-frequency converter 11 until balance of the bridge is established. At this instant, the value of the voltage $E_f$ generated by the balance arm circuitry is substantially equal to the voltage $E_c$ generated across the resistor $R_x$ under test.

As aforementioned, the voltage signal as is identified as $E_c$ is combined with the feedback voltage $E_f$ generated by the frequency to resistance current converter 12 whereby the difference voltage signal $(E_c - E_f)$ is applied through chopper circuit 35 to the amplifier 10.

Chopper 35 comprises as seen in FIG. 4A a pair of high speed photoresistors V1 and V2 connected in series to each other and across the amplifier input and function to change the direct-current signal input to the amplifier 10 into an alternating current signal.

The photoresistors V1 and V2 are optically coupled by any suitable light transmitting means, such as a Lucite tubular pipe or the like as is diagrammatically indicated by the dotted lines P to a neon tube multivibrator 40 comprising neon tubes V5 and V6 which are connected across load resistors R19, R30 respectively in the collector circuit of transistors Q6 and Q9.

As illustrated, the multivibrator comprising Q6–Q9 is conventional in circuit configuration being connected across the chassis or instrument ground and suitable voltage sources as indicated at +190 and +20 volts. The multivibrator is an astable or a free running oscillator in operation, the frequency of oscillation thereof being determined, as will be understood, by variable load resistor R31. Resistor R32 connected across the multivibrator functions to establish the range of adjustment for the frequency control of resistor R48.

In the circuit configuration as herein shown the preferred frequency of oscillation for the multivibrator is approximately 108 cycles per second whereby it is insensitive to 60 cycle transients. With the multivibrator thus oscillating, neon tubes V5, V6 are alternately illuminated whereby the light emanating therefrom is transmitted by the aforementioned optical coupling P to, in turn, alternately activate the photoresistors V1, V2.

The alternate activation of resistors V1, V2 converts the input voltage signal ($E_c - E_f$) across the input of amplifier 10 into a corresponding alternating current signal which is then coupled by capacitor C6 to the first stage Q1 of direct coupled amplifier 10.

As shown in FIG. 4A, the amplifier 10 has four stages of amplification, the 2nd, 3rd, and 4th stages comprising conventional NPN transistor amplifier Q3, Q4 and Q5 respectively connected in cascade grounded emitter configuration. The first stage comprises a field effect transistor (FET) Q1 used to provide the amplifier with a high impedance input, and which is direct coupled to the 2nd stage Q3. Transistor amplifier Q2 and its associate circuitry provides suitable direct current feedback to amplifier stage Q1 to effect stability. With the component values identified herein, the gain of the amplifier 10 is approximately $3 \times 10^4$ ($E_c - E_f$).

The signal output of amplifier 10 is coupled by capacitor C10 into a coherent demodulator 52 comprising photoresistors V3 and V4 which are also optically coupled to the aforesaid multivibrator Q6-Q9 by suitable light transmitting means such as a Lucite pipe as schematically shown at P.

The photoresistors V3, V4 function in the same manner as resistors V1, V2 to convert the alternating current signal output of the amplifier 10 into direct current of corresponding magnitude.

The direct current signal output from demodulator 52 is applied to an integrator circuit network 53 comprising resistor and capacitor filter components R17, R16, R18, C11 and C12 which function to further smooth said demodulated direct current signal.

The output current from the demodulator 52 flows through resistor R14. The voltage across R14 is used to provide feedback through conductor 60 to the base circuit of transistor Q2 of the amplifier 10.

The smoothed output voltage of the integrator network 53 is about 4,000 times larger than the voltage ($E_c - E_f$) appearing across the chopper V1, V2. The polarity of the output voltage is negative.

The filtered direct current signal appearing at point G' as shown in FIG. 4B is then applied to the input of a direct current to frequency converter identified in its entirety at 11.

The input to the converter 11 comprises a differential amplier Q22, Q23 and associated circuit components which operates to invert the negative going signal from the integrator circuit 53 to a positive going signal. As shown in FIG. 4B, the negative going signal from integrator network 53 is applied to the base electrode of transistor Q23 of the differential amplifier which causes transistor Q22 to conduct heavily.

The resultant amplified signal output from the collector electrode of transistor Q22 is then applied to the base electrode of transistor amplifier Q21.

The converter 11 also includes unijunction transistor Q20 which, with its associated circuitry, functions as an astable pulse generator. The frequency of oscillation of the pulse train generated by pulse generator Q20, as will be understood, is determined by its timing capacitors C34 and C35 connected across its input circuit and the charging cycle of capacitor C37.

Feedback network comprising capacitor C36, variable resistor R73, diode CR9, resistor R74 and capacitor C37 connects the output of transistor amplifier Q21 back to the differential amplifier Q22, Q23. Capacitor C36 functions to discharge sharply to generate a negative pulse which is then rectified by diode CR9. The resulting negative direct current voltage pulse output from said diode CR9 is therefore proportional to the pulse repetition rate of the pulse generator Q20, and is used as a feedback voltage and fed back to the base electrode of transistor Q22 of the differential amplifier Q22, Q23. As seen in FIGS. 4A and 4B, this feedback voltage is applied to the upper end of capacitor C37 whereby to charge said capacitor negatively. As will be realized this effects to stabilize the frequency of operation of the direct current to frequency converter 11.

When transistor Q22 is turned on transistor Q21 is turned off, and as a result unijunction transistor Q20 turns on to provide a pulse to a flip-flop circuit comprising transistor multivibrator Q15 and Q16 which is a part of the frequency-to-resistance converter as identified at 12.

When Q20 fires, capacitor C36 discharges to provide a negative pulse through diode CR9 to the upper end of capacitor C37 which then charges to this negative potential. The voltage level of base of transistor Q22 is also lowered by this negative potential thereby cutting off said transistor Q22.

When transistor Q22 is turned off this turns on Q23 which, in turn, prevents capacitor C36 from recharging.

The circuit remains in this state until the voltage signal from integrator network 53 overcomes the negative charge on capacitor C37. When this occurs, the base potential of transistor Q22 is again raised whereby to turn on said transistor. With transistor Q22 turned on, transistor Q23 is again turned off whereby the potential on the collector of Q21 and base electrode of unijunction transistor Q20 begins to rise. This is delayed while capacitor C36 is charged whereupon the level of the potential of said base electrode is raised sufficiently to turn on unijunction transistor Q20 and as a result the cycle is repeated. The time between cycles or the time between pulses and likewise the number of pulses in the signal output from transistor generator Q20 is thus dependent on the charging rate of capacitor C36 which in turn is dependent upon the charging rate of capacitor C37 which is governed by the resistance R75 and the magnitude of the direct current input signal to the differential amplifier Q22, Q23.

The output signal from unijunction transistor Q20 of converter 11 is a negative going pulse which is applied via conductor 75 to the flip-flop circuit of the frequency to resistance converter 12 which comprises transistor multivibrator Q15 and Q16 connected at its output collector electrodes to the base electrodes of a pair of switching transistors Q13 and Q14.

With the application of the pulse signal from transistor generator Q20, flip-flop circuit Q15 and Q16 is alternately triggered to produce a square wave signal, as will be understood, the frequency thereof being one-half the frequency of said unijunction pulse signal of generator Q20.

The square wave pulse output of the flip-flop Q15, Q16 when applied to each base electrode of switching transistors Q13 and Q14 is effective to alternately fire said transistors Q13 and Q14.

As herein shown transistors Q13 and Q14 are each preferably metal-oxide silicon field effect transistors or Mosfet type as commonly called, so as to provide a relatively high input impedance to the flip-flop circuit, and to thereby be sufficiently insensitive to transient signals from the latter.

As seen in FIG. 4A, a plurality of capacitors C19, CX1 and C20 are connected in parallel across the drain and source electrodes of Q13. In turn, conductor 80 connects to said source electrode Q13 and to bridge terminal A.

Also, conductor 81 connects to wiper contact $w_8$ of switch S, to the source electrode of Q14, and to bridge terminal B whereby the output of the frequency-to-resistance converter 12 is connected across bridge terminals A and B.

As is also shown in FIG. 4A, a series of additional variable capacitors identified as C21-C29, C39 are each connected on one side to conductor 80 and on the opposite side to a stationary contact disposed to be selectively engageable by wiper contact $w_7$ of switch S.

Switch S is shown in its milliohm range wherein wiper contact $w_7$ is in engagement with its uppermost associated stationary contact to connect capacitor C21 in parallel with capacitors C19, CX1 and C20.

And, as the switch S is actuated selectively to each of its other ranges as noted in FIG. 4A, one of the capacitors C22–C29, C39 is similarly connected across said capacitor C19, CX1 and C20.

As is likewise shown in FIG. 4A, a voltage supply comprising junction FET transistor Q18, regulator transistor Q19 and emitter follower Q17 and associated circuitry is connected across the plus 20 volt source and instrument ground. Regulator Q19 is connected across ground and the minus 20 volt source and has its collector electrode connected to the source electrode of junction FET transistor Q18. The gate electrode of Q18 is connected by conductor 83 to the junction of capacitor C3 and resistor $R_2$ of the integrator circuit 37 being thus capable of applying the voltage $E_f$ to said gate electrode whereby the transistor Q18 is actuated by said voltage $E_f$.

The output of the power supply for instrument ranges between the milliohm and 10 megohm ranges is taken from the emitter follower Q17 and applied by conductor 84 to the stationary contacts associated with the wiper contact $w_8$ in said instrument ranges. In these ranges, the power supply voltage is preferably approximately minus 10 volts, however in the 10 megohm range the power supply voltage is reduced to approximately one volt as a result of the regulator Q19.

In the 100 and 1000 megohm ranges, the output of the power supply is taken from the source electrode of transistor Q18 by conductor 86 and connected to the associated stationary contacts for wiper contact $w_8$ in the aforesaid ranges.

As shown, this supply voltage is applied by conductor 81 to bridge terminal B.

With this circuit structure, each time Q16 of the multivibrator Q15, Q16 fires, Q14 is turned on to apply the source voltage of the power supply to the capacitors C19–CX1, C20 and the connected range capacitor whereupon they are charged to said supply voltage.

Likewise, each time Q15 of said multivibrator is fired, Q13 is turned on to connect said charged capacitors thereacross whereupon said capacitors discharge to provide a voltage pulse which is defined as voltage $E_f$ and which is taken from bridge terminal A and applied through conductor 80 to the input of the integrator circuit 37.

The voltage which appears at bridge terminal C is the voltage across the unknown resistance $R_x$ which is identified as $E_c$ and is applied via conductor 33 to the integrator circuit 34.

With this circuitry, voltages $E_c$ and $E_f$ which are of the same polarity (negative) are applied through integrator circuits 34, 37 across the chopper (V1, V2) 35 in opposition to each other whereby the difference voltage $(E_c-E_f)$ is applied to the amplifier 10.

As previously mentioned, the voltage difference $(E_c-E_f)$ is amplified inverted and applied to the input of the direct current-to-frequency converter 11 which generates a pulse train whose frequency is approximately proportional to the voltage applied to it.

This pulse train is used to activate the highly precise frequency-to-resistance converter 12, the output of which is voltage $E_f$.

As will be realized, when $E_c$ and $E_f$ are equal in magnitude the difference in potential therebetween and across bridge terminals A, C will be substantially zero thus indicating that the bridge is in balance.

And, when in balance, the number of pulses in the pulse train output of the direct current-to-frequency converter 11 is representative of the magnitude of the unknown resistance $R_x$ under test.

As previously mentioned, the balance arm of the bridge circuit is connected into the bridge at terminals A, B.

The circuitry comprising said balance arm in its simplified diagrammatic form can be represented as a two terminal device as is shown in FIG. 4C and to have an equivalent circuit resistance $R_F$.

Looking into the terminals $t_1$, $t_2$, the balance arm circuitry is represented by a capacitor $C_1$ connected at its upper end to the movable arm of a single pole-double throw switch S which has two switch positions $a$ and $b$. Capacitor $C_1$ represents C19, CX1, C20 and the additional trimmer range capacitor (C21–C29, C39) connected across transistors Q13, and Q14, said transistors Q13, Q14 representing the single pole-double throw switch S, as shown in the actual circuit in FIG. 4A.

In switch position $a$, capacitor $C_1$ is connected across the source of voltage V and is charged thereby. This instant of time represents the period when transistor Q14 is turned on to charge said capacitors.

In switch position $b$ the capacitor $C_1$ is shorted whereby it rapidly discharges. This instant of time represents the period when transistor Q13 is turned on to discharge said capacitors.

The total electrical charge Q in coulombs taken by the capacitor $C_1$ per cycle of operation of switch S is determined by the equation $Q=C_1V$; and assuming that the capacitor $C_1$ is fully discharged Q also represents the electrical charge that is dissipated or taken from said capacitor per each said cycle.

As aforesaid, this circuitry, looking into terminals A and B allows the electrical charge Q to flow from A to B upon a cycle of operation of switch S. Current, I, is defined as the amount of electrical charge Q flowing per unit time, in seconds. Or $I=Q/t$, and as the switch operates at a time interval inversely proportional to the frequency of operation, $I=Qf$.

Substituting $Q=C_1v$ into the equation $I=Qf$ results in $I=C_1Vf$. Ohm's law states $I=V/R$. Substitution of $V/R$ for I in the equation $I=C_1Vf$ results in $V/R=C_1Vf$ which simplifies into the equation $R=1/C_1f$ where $C_1$ is the magnitude of the capacitor in farads, and $f$ is the frequency of the operation of the switch S in Hertz. The quantity R therefrom determined is denoted as $R_f$ since its apparent value is a function of frequency, $f$.

In the bridge circuit of FIG. 4A, the balance arm is connected into the bridge at terminals A, B, and therefore has an equivalent resistance, looking toward said terminals into said arm according to the above formula: $R_F=1/Cf$.

Also, as above noted, the capacitors C19, CX1, C20 and the appropriate range trimmer capacitor (C21–C29, C39) representing capacitor $C_1$ are alternately charged and discharged by the switch circuit comprising transistors Q13, Q14, the frequency of triggering of said transistors Q13, Q14 being controlled by the frequency of the direct current-to frequency converter 11, said frequency being identified as $f$ in said equation.

As is now realized, in the bridge circuit, the equivalent resistance ($R_F$) of the balance arm represents resistance $R_3$ in the formula for determining the unknown resistance $$\left(R_x = R_2\left(\frac{R_1}{R_3}\right)\right)$$

in the standard Wheatstone bridge.
Substituting $$R_f = \frac{1}{C \times f}$$

for $R_3$ in the above equation provides:

$$R_x = R_2\left(\frac{R_1}{\frac{1}{C \times f}}\right)$$

and solving for $$R_x = \frac{R_2 R_1 C f}{K}$$

and simplifying: $R_x = Kf$ where K is a constant as determined by the branch ratio arm and balance arm circuits of the bridge and $f$ is the frequency of the direct current-to-frequency converter 11.

As thus determined, the magnitude of the unknown resistance $R_x$—at the instant of balance of the bridge—is therefore proportional to the frequency of the converter 11.

The collector electrode of transistor Q15 as best seen in FIG. 4A is also connected by conductor 89 to the base of transistor Q30 FIG. 4B connected into the instrument circuitry as an amplifier inverter. The square wave produced by the flip-flop circuit Q15, Q16 is differentiated by the RC network, R110, C30 and applied to the amplifier inverter Q30.

The amplifier inverter Q30 takes the differentiated square wave and amplifies it to provide a series of negative going pulses. The number or the frequency of these pulses is one-half the frequency of the DC to frequency converter pulse output Q20 which output, in turn, is directly related to the magnitude of the voltage $E_c$ that is developed across the unknown resistance $R_x$ under test.

As seen in FIG. 4B, the pulse output of amplifier inverter Q30 is applied to the transistor gate Q29 which is turned on to permit a predetermined number of said pulses to pass through conductor 90 and terminal P1 to the readout instrument above referred to wherein the said pulses are digitally totalized to indicate the magnitude of the resistance $R_x$ under test.

The manner in which this counter and readout device functions to digitally totalize the pulse count is described in detail in the instruction manual published by The Hickok Electrical Instrument Company of Cleveland, Ohio, entitled Digital Measuring System—Main Frame DMS–3200 and also in applicant's copending application Ser. No. 599,062, filed Dec. 5, 1966 and entitled Digital Voltmeter. Therefore its operation need not be discussed herein in detail.

The pulse signal output or pulse train of the amplifier inverter Q30 is permitted to pass to the counter and readout instrument through conductor 90 as long as the transistor gate Q29 is turned off.

The gate Q29, as best seen in FIG. 4B, is connected between the output of the amplifier-inverter Q30 and a multivibrator circuit Q27, Q28 identified as the gate driver flip-flop circuit.

The gate driver flip-flop circuit is a monostable, flip-flop and is connected to the output of a sync gate circuit Q26.

The sync gate Q26 is connected to the output of a display time generator Q25 which is connected in turn to the output of a 60 cycle shaper Q24.

The 60 c.p.s. shaper Q24 is operable to convert a 60 c.p.s. sinewave applied by conductor 91, FIG. 4B, to its base electrode into a square wave which is applied to the base of unijunction transistor Q25 to sync the display time generator thereto. The 60 cycle voltage source may be applied to terminal P10 as shown and is preferably approximately 27.8 volts and may be provided by the power supply incorporated with the display and counter instrument. The square wave output of Q24 is differentiated by the RC network C41 and R84 to serve as the sync signal for the gate flip-flop.

The display time generator Q25 is a synced unijunction relaxation oscillator. The frequency of oscillation may be varied by varying the resistor R88 whereby the change the gate potential of said generator. The display generator can also be disabled to provide infinite display of the count totalized in the display and counter instrument by closing switch S2 in the gate circuit of said generator Q25. In this mode of operation the supply voltage for the emitter of Q25 is reduced to below its firing point.

When the generator Q25 is fired, a voltage pulse is developed across resistor R87 which is applied via conductor 92 and terminal P9 to the display and counter instrument effective to reset the counting circuitry to zero whereby the next count will start at zero.

The sync gate Q26 which is normally closed is in series with pulses produced by the 60 c.p.s. shaper Q24. For these pulses to reach the gate drive flip-flop Q27, Q28 they are allowed to pass through the sync gate. When a reset pulse is produced by the display time generator Q25 signaling the start of a count the sync gate is opened sufficiently long to permit one 60 c.p.s. pulse to enter the gate drive flip-flop, changing its state of operation.

When the unijunction oscillator Q25, fires at its preselected frequency the reset pulse derived from resistor R87 is also coupled to the base electrode of the sync gate transistor Q26 effective to turn on or open the same.

With the gate Q26 held open by the reset pulse, it permits a pulse from Q24 via conductor 96 to enter the normally-off side Q27 of the monostable flip-flop Q27, Q28, whereby the flip-flop triggers or switches to turn-on Q32. This opens the gate Q29 and permits the pulse train from the amplifier-inverter Q30 to pass to the counter and display instrument. After a period of time as is determined by the resistance R99, capacitance C44 combination, the sixth 60 Hz. pulse from the start of the count will carry Q28 into conduction and the flip-flop will return to its original state. This closes or brings the gate Q29 into conduction whereby the pulse train from Q30 is passed to the instrument ground thus ending the pulse count.

A bridge unbalance circuit comprising of transistors Q11 and Q12 connected as an astable flip-flop operate to provide a visual indication of a bridge unbalance condition. A neon lamp V7 is seen to be connected across the output of transistor Q10.

If an unbalance condition exists in the bridge, current will flow through resistor R14 of the demodulator 52 which is applied by conductor 98 to the base of Q11 effective to alter the bias thereon. As a result, a relative unbalance occurs in the collector voltage of Q11 with respect to the collector voltage of Q12. In the event of sufficient unbalance, diodes CR2 or CR3 in the collector circuit of Q11 will conduct causing, in turn, a conduction of Q10 and the ignition of the neon lamp V7.

As is well known four terminal resistors are commonly used for current shunts. The present instrument is capable of precisely measuring the true resistance as a shunt of such a resistor. Generally, when measuring four terminal resistors the current source to the resistor to be tested is applied to its current terminals while the voltage terminals provide a means of measuring the voltage drop across the resistor proper. Such connection can be facilitated with the present instrument.

For this purpose, and with reference to FIG. 4A, the straps X are disconnected from between pairs of terminals D and L, and C and K.

The terminal K is connected to one end of the unknown resistance $R_x$ proper, and the terminal D is connected to the opposite end of said resistance. Terminals D and K are hence the voltage terminals. Terminal C is then connected to the end of the resistance lead on the side thereof to which terminal K is connected and terminal L is similarly connected to the end of the opposite lead. Terminals C and L are thereby the current terminals.

The resistor $R_x$ is then connected into the digital instrument as shown in FIG. 1C, where A' and B' represent the "current" terminals and A" and B" the "voltage" terminals.

When measuring high values of resistance, the bridge circuit of the present instrument must take into account leakage paths both through and around insulating materials. This is generally done by "guarding," that is, by intercepting leakage currents and then routing them by the most harmless path. Also, by reducing voltage potentials between points where leakage may occur, currents may be reduced.

Such measures are frequently essential if accurate measurements are to be taken. If $R_x$ is 1000MΩ, a shunt leakage in the test set-up of $10^{12}$ Ω will cause 0.1% error. Likewise, for example, two terminals mounted on electrical grade Bakelite 2" apart will cause nearly 0.2% error. Leakage between thermoplastic wires will also be found to be excessive under moderately humid conditions. In general, therefore, insulators are not to be trusted.

As seen in FIG. 4A, when the guard is connected to external guards, shields, etc., the leakage from these points to ground is a shunt around bridge resistance $R_1$, and if low enough, will effect the accuracy of the instrument. In general, resistance from guarded points to ground should exceed 1000MΩ on the 100MΩ range, 100MΩ on the 100MΩ range, etc., if extraneous errors above 0.1% are to be avoided. Also, leakage resistance from the guarded points to $R_x$ should exceed 200MΩ.

As previously mentioned, the digital ohmeter of the present invention is capable of accurately measuring the magnitude of an unknown resistance $R_x$ in the range between 1 milliohm to 1000 megohm within an accuracy of ±0.1% of the visual indication of the readout instrument.

The table of component values hereinafter included herein and individually identified by the reference character incorporated in the drawings and specification herein identify merely one embodiment of components applicable for use herein.

In order that the instrument circuitry operate satisfactorily over this wide range it is first calibrated in each of the ranges of operation.

This is accomplished as follows.

The digital ohmmeter instrument is connected to a suitable counter and display instrument of the aforesaid Hickok Model DMS-3200 and to the identified sources of power as indicated at the several terminals in FIGS. 4A, 4B.

With the gate circuitry Q27, Q28 and multivibrator Q7, Q8 operating in the manner aforementioned, the bridge power supply Q17–Q19 is adjusted in the 1000 megohm range so that it provides −10 volts D.C.±3%. In this adjustment a laboratory standard resistance having a value of 1000 megohm±2% is connected to the bridge terminals C, D, the latter being strapped by straps X to terminals K and L, respectively. A suitable D.C. voltmeter is connected between the guard terminal and bridge terminals D or L. The resistance R67 may be adjusted to obtain the above desired voltage.

The ohmmeter instrument is next adjusted to provide a zero calibration for all ranges. This is accomplished by connecting a suitable laboratory standard resistance of 100 ohms±1% to bridge terminals C and D and connecting a suitable D.C. voltmeter across terminals A and C, the voltmeter being on 1 milliwatt scale. Terminals C and K are strapped together. The indicated reading on the voltmeter should be zero and if not, adjustment of resistor R13 is made until such reading is zero.

Next, the instrument is adjusted to provide proper signal gain for all ranges of operation. This is accomplished by connecting a laboratory standard resistance of 1000 ohms±1% to bridge terminals C and D. A suitable D.C. voltmeter is connected across bridge terminals A and C and a voltage of 50μ volts should be observed. If not, resistor R73 in the direct current-to-frequency converter 11 is adjusted until such voltage is obtained.

Next, for each of the instrument ranges 100 ohms-1000 megohm, a suitable laboratory standard resistor representing a full scale reading is selected and connected across bridge terminals C, D. The value of this standard resistance is then read on the display instrument. It was previously noted that one of the capacitances in the frequency to resistance converter 12 was identified as CX1. The actual value selected for this capacitance is that which will provide a full scale reading for the resistance being measured. For example, if the standard resistance is the 1000 ohm resistance, capacitances CX1 is selected to have a value which provides as close a full scale reading of this value (1000 ohms) as possible.

Once this selection has been made for capacitance CX1 it will be suitable for all ranges of the instrument.

With the selection of the capacitance CX1, the appropriate trimmer capacitance for the range is then adjusted until the actual reading observed on the display instrument is a full scale reading for the selected range.

For example, if the instrument is in the 1000 ohm scale, the trimmer capacitance C24 is adjusted to provide the correct reading. The trimmer capacitance for each of the remaining instrument ranges is identified in FIG. 4A.

If it is observed that the reading on all ranges deviates from the respective standard by the same number of digits, the capacitance C20 may be adjusted which adjustment will also be operable for all ranges.

The average voltage developed by the discharged of the range capacitances in the converter 12 provides the feedback voltage $E_f$ that is combined with the voltage $E_c$ developed across the resistance being measured, either as in the present instance the standard laboratory resistance or in the case of an unknown resistance under test.

In the 1 ohm and 10 ohm instrument ranges the respective laboratory standards must be connected into the bridge as a four wire system in the manner as identified in FIG. 1C.

With the instrument calibrated in this manner it has a linear range capability of twice full scale with the exception of the two highest ranges, i.e., the 100 megohm and 1000 megohm ranges. In this manner, increased resolution and maximum accuracy is obtained in measurement of resistances.

If the instrument is overranged past its linear range, the bridge unbalance circuit will visually indicate an unbalance when the error exceeds about 0.5%.

Having thus described a preferred embodiment of digital instrument for measuring resistance it will be recognized that it is susceptible to various modifications, combinations and arrangements of circuitry without departing from the inventive concepts thereof as are defined in the claims.

COMPONENT LIST

C=Capacitor.
R=Resistor.
Q=Transistor.
S=Switch.
V=Photocell.

| REF. NO. | NAME AND DESCRIPTION |
|---|---|
| C1 | Capacitor, fixed, metallized Mylar: 1 μf., 10%., 100 v. |
| C2 | Capacitor, fixed, polyester film: 1,000 pf., 5%., 400 v. |
| C3 | Capacitor, fixed, miniature Mylar, phenolic coating: .1 μf., 10%, 200 v. |
| C4 | Capacitor, fixed, Mylar dipped epoxy: .22 μf., 10%, 100 v. |
| C5 | Same as C2. |
| C6 | Same as C2. |
| C7 | Capacitor, fixed, ceramic: 47 pf., 20% 500 v. |
| C8 | Capacitor, fixed, electrolytic: tantalum, 5.0 μf., 20%, 20 v. |
| C9 | Capacitor, fixed, ceramic: 1,000 pf., +50 −20%, 500 v. |
| C10 | Capacitor, fixed, epoxy dipped polyester film: 22 μf., 10%, 200 v. |
| C11 | Capacitor, fixed, electrolytic: 47 μf., 20%, 25 v. |
| C12 | Capacitor, fixed, Mylar dipped epoxy: .22 μf., 10%, 100 v. |
| C13 | Same as C12. |
| C14 | Same as C4. |
| C15 | Same as C8. |
| C16 | Same as C4. |
| C17 | Same as C12. |
| C18 | Capacitor, fixed, miniature Mylar, phenolic coating: .047 μf., 10%, 200 v. |
| C19 | Capacitor, fixed, silver mica: 3000 pf., 1%, 500 v. |

| | |
|---|---|
| C20 | Capacitor, variable: trimmer type, 2–18 pf. |
| C21 | Same as C20. |
| C22 | Same as C20. |
| C23 | Same as C20. |
| C24 | Same as C20. |
| C25 | Same as C20. |
| C26 | Same as C20. |
| C27 | Same as C20. |
| C28 | Same as C20. |
| C29 | Same as C20. |
| C30 | Capacitor, fixed, dipped mica: 5 pf., 10%, 500 v. |
| C31 | Same as C7. |
| C32 | Same as C7. |
| C33 | Same as C8. |
| C34 | Same as C7. |
| C35 | Capacitor, fixed, ceramic: 100 pf., 20%, 500 v. |
| C36 | Same as C35. |
| C37 | Same as C3. |
| C38 | Same as C3. |
| C39 | Same as C20. |
| C40 | Same as C12. |
| C41 | Capacitor, fixed, ceramic: .0047 µf., +50−20%, 500 v. |
| C42 | Same as C8. |
| C43 | Same as C12. |
| C44 | Capacitor, fixed, Mylar dipped epoxy: .47 µf., 10%, 100 v. |
| C45 | Same as C41. |
| C46 | Same as C35. |
| C47 | Same as C9. |
| C48 | Same as C2. |
| C49 | Same as C2. |
| CR1 | Semi-conductor device, diode: selected (2N3566). |
| CR2 | Semi-conductor device, diode: 1N914. |
| CR3 | Same as CR2. |
| CR4 | Same as CR2. |
| CR5 | Same as CR2. |
| CR6 | Same as CR2. |
| CR7 | Same as CR2. |
| CR8 | Same as CR2. |
| CR9 | Same as CR2. |
| CR10 | Same as CR2. |
| CR11 | Same as CR2. |
| CR12 | Same as CR2. |
| CR13 | Same as CR2. |
| CR14 | Same as CR2. |
| CR15 | Same as CR2. |
| CR16 | Same as CR2. |
| CR17 | Same as CR2. |
| CR18 | Same as CR2. |
| Q1 | Transistor: Mosfet (input). |
| Q2 | Transistor: 2N3566 NPN silicon general purpose. |
| Q3 | Same as Q2. |
| Q4 | Same as Q2. |
| Q5 | Transistor: silicon high voltage, 40354. |
| Q6 | Transistor: A 130 NPN silicon high voltage. |
| Q7 | Same as Q2. |
| Q8 | Same as Q2. |
| Q9 | Same as Q6. |
| Q10 | Same as Q5. |
| Q11, Q12 | Transistor: selected, paired for same color code (2N3566). |
| Q13 | Transistor: Mosfet (switching). |
| Q14 | Same as Q13. |
| Q15 | Transistor: 2N3644 PNP high B, high voltage general purpose silicon. |
| Q16 | Same as Q15. |
| Q17 | Same as Q2. |
| Q18 | Transistor: FET N Channel, plastic, selected, SS3567. |
| Q19 | Same as Q2. |
| Q20 | Transistor: unijunction, 2N4852. |
| Q21 | Same as Q15. |
| Q22 | Same as Q2. |
| Q23 | Same as Q2. |
| Q24 | Same as Q2. |
| Q25 | Same as Q20. |
| Q26 | Same as Q2. |
| Q27 | Same as Q2. |
| Q28 | Same as Q2. |
| Q29 | Transistor: 2N3640 PNP silicon, high frequency. |
| Q30 | Same as Q2. |
| R1 | Resistor, fixed, composition: 10MΩ, 5%, ½ w. |
| R2 | Resistor, fixed, composition: 1MΩ, 10%, ½ w. |
| R3 | Resistor, fixed, composition: 47MΩ, 10%, ½ w. |
| R4 | Resistor, fixed, composition: 10KΩ, 10%, ½ w. |
| R5 | Resistor, fixed, composition: 22KΩ, 10%, ½ w. |
| R6 | Not used |
| R7 | Resistor, fixed, composition: 330Ω, 10%, ½ w. |
| R8 | Resistor, fixed, composition: 100Ω, 10%, ½ w. |
| R9 | Same as R4. |
| R10 | Resistor, fixed, composition: 1.5MΩ, 10%, ½ w. |
| R11 | Resistor, fixed, composition: 4.7MΩ, 10%, ½ w. |
| R12 | Resistor, fixed, composition: 100KΩ, 10%, ½ w. |
| R13 | Resistor, variable: wire wound, 10KΩ, 20%, 2 w. |
| R14 | Resistor, fixed, composition: 47KΩ, 10%, ½ w. |
| R15 | Same as R1. |
| R16 | Same as R12. |
| R17 | Same as R14. |
| R18 | Resistor, fixed, composition: 1KΩ, 10%, ½ w. |
| R19 | Same as R2. |
| R20 | Same as R4. |
| R21 | Same as R4. |
| R22 | Same as R4. |
| R23 | Resistor, fixed, composition: 750KΩ, 5%, ½ w. |
| R24 | Resistor, fixed, composition: 680Ω, 10%, ½ w. |
| R25 | Same as R23. |
| R26 | Same as R4. |
| R27 | Same as R4. |
| R28 | Same as R4. |
| R29 | Same as R4. |
| R30 | Same as R2. |
| R31 | Same as R13. |
| R32 | Same as R4. |
| R33 | Same as R4. |
| R34 | Same as R14. |
| R35 | Same as R14. |
| R36 | Same as R2. |
| R37 | Same as R10. |
| R38 | Resistor, fixed, metal film: 28.7KΩ, 1%, ½ w. |
| R39 | Resistor, fixed, metal film: 1.78KΩ, 1%, ½ w. |
| R40 | Resistor, fixed, metal film: 3.16KΩ, 1%, ½ w. |

| | | |
|---|---|---|
| R41 | _____ | Resistor, fixed, metal film: 90.9KΩ, 1%, ½ w. |
| R42 | _____ | Same as R38. |
| R43 | _____ | Same as R39. |
| R44 | _____ | Resistor, fixed, metal film: 511Ω, 1%, ½ w. |
| R45 | _____ | Resistor, fixed, composition: 300Ω, 5%, ½ w. |
| R46 | _____ | Resistor, fixed, wire wound: 99.5Ω, .5%, ¼ w, temp. coeff. ±20 p.p.m. |
| R47 | _____ | Resistor, fixed, metal film: 300Ω, .5%, −40 p.p.m. to +15 p.p.m. per ° C. from 10° C. to 50° C., ½ w. |
| R48 | _____ | Resistor, fixed, metal film: 1KΩ, .5%, −40 p.p.m. to +15 p.p.m. per ° C. from 10° C. to 50° C., ½ w. |
| R49 | _____ | Resistor, fixed, metal film: 10KΩ, .5%, −40 p.p.m. to +15 p.p.m. per ° C. from 10° C. to 50° C., ½ w. |
| R50 | _____ | Resistor, fixed, metal film: 100KΩ, .5%, −40 p.p.m. to +15 p.p.m. per ° C. from 10° C. to 50° C., ½ w. |
| R51 | _____ | Resistor, fixed, metal film: 1MΩ, .5%, −40 p.p.m. to +15 p.p.m. per ° C. from 10° C. to 50° C., ½ w. |
| R52 | _____ | Resistor, fixed, metal film: 3MΩ, .5%, −40 p.p.m. to +15 p.p.m. per ° C. from 10° to 50° C., 1 w. |
| R53 | _____ | Resistor, fixed, metal film: 10MΩ, .5%, −40 p.p.m. to +15 p.p.m. per ° C. from 10° C. to 50° C., 2 w. |
| R54 | _____ | Same as R53. |
| R55 | _____ | Same as R53. |
| R56 | _____ | Same as R14. |
| R57 | _____ | Same as R4. |
| R58 | _____ | Same as R2. |
| R59 | _____ | Same as R2. |
| R60 | _____ | Same as R14. |
| R61 | _____ | Resistor, fixed, metal film: 10KΩ, 1%, ½ w. |
| R62 | _____ | Same as R61. |
| R63 | _____ | Same as R4. |
| R64 | _____ | Same as R4. |
| R65 | _____ | Resistor, fixed, metal film: 475Ω, 1%, ½ w. |
| R66 | _____ | Resistor, fixed, composition: 3.3KΩ, 10%, ½ w. |
| R67 | _____ | Same as R13. |
| R68 | _____ | Same as R4. |
| R69 | _____ | Resistor, fixed, composition: 15KΩ, 10%, ½ w. |
| R70 | _____ | Same as R7. |
| R71 | _____ | Resistor, fixed, composition: 150KΩ, 10%, ½ w. |
| R72 | _____ | Same as R12. |
| R73 | _____ | Resistor, variable: wirewound, 2KΩ, 20%, 2 w. |
| R74 | _____ | Resistor, fixed, composition: 4.7KΩ, 10%, ½ w. |
| R75 | _____ | Resistor, fixed, composition: 220KΩ, 10%, ½ w. |
| R76 | _____ | Resistor, fixed, composition: 56KΩ, 10%, ½ w. |
| R77 | _____ | Same as R2. |
| R78 | _____ | Same as R71. |
| R79 | _____ | Resistor, fixed, composition: 470dΩ, 10%, ½ w. |
| R80 | _____ | Same as R5. |
| R81 | _____ | Not used. |
| R82 | _____ | Same as R4. |
| R83 | _____ | Same as R4. |
| R84 | _____ | Same as R74. |
| R85 | _____ | Same as R74. |
| R86 | _____ | Same as R79. |
| R87 | _____ | Resistor, fixed, composition: 150Ω, 10%, ½ w. |
| R88 | _____ | Resistor, variable: composition, 1MΩ, 20%, ½ w. |
| R89 | _____ | Same as R12. |
| R90 | _____ | Same as R4. |
| R91 | _____ | Same as R79. |
| R92 | _____ | Resistor, fixed, composition: 33KΩ, 10%, ½ w. |
| R93 | _____ | Same as R71. |
| R94 | _____ | Same as R4. |
| R95 | _____ | Same as R4. |
| R96 | _____ | Same as R5. |
| R97 | _____ | Same as R13. |
| R98 | _____ | Same as R61. |
| R99 | _____ | Resistor, fixed, metal film: 287KΩ, 1%, ½ w. |
| R100 | _____ | Same as R92. |
| R101 | _____ | Same as R12. |
| R102 | _____ | Same as R12. |
| R103 | _____ | Same as R69. |
| R104 | _____ | Same as R5. |
| R105 | _____ | Same as R12. |
| R106 | _____ | Resistor, fixed, composition: 2.2KΩ, 10%, ½ w. |
| R107 | _____ | Same as R4. |
| R108 | _____ | Same as R74. |
| R109 | _____ | Same as R66. |
| R110 | _____ | Same as R4. |
| R111 | _____ | Resistor, fixed, composition: 270KΩ, 10%, ½ w. |
| R112 | _____ | Same as R75. |
| R113 | _____ | Same as R75. |
| S1 | _____ | Switch: rotary, 4 section, 10 position (range). |
| S2 | _____ | Part of R88. |
| V1 | _____ | Cell: photo, selected, "on" resistance from 50K to 250KΩ. |
| V2 | _____ | Same as V1. |
| V3 | _____ | Cell: photo, selected, "on" resistance of less than 50KΩ and more than 5KΩ. |
| V4 | _____ | Same as V3. |
| V5 | _____ | Lamp: NE2U. |
| V6 | _____ | Same as V5. |
| V7 | _____ | Lamp: pilot light, BNF-2, clear, 115 v. |

What is claimed is:

1. A digital instrument for measuring resistance comprising a modified automatically adjustable Wheatstone bridge circuit having a pair of branch circuits each having a predetermined magnitude of resistance and defining a ratio arm of said bridge circuit, a balance arm interconnecting adjoining ends of said ratio arms and defining first and second bridge terminals, a resistance of unknown value and means for connecting said resistance of unknown value to the opposite ends of said ratio arms to define third and fourth bridge terminals, a source of voltage and means for connecting said source to one of said bridge terminals, an instrument ground and means for connecting the bridge terminal remote from said one terminal to said ground, amplifier means, first conductor means for operatively connecting said amplifier means to said bridge effective to apply the voltage developed across said unknown resistance to said amplifier means, second conductor means for connecting said amplifier means to said first bridge terminal effective to apply the voltage developed across said balance arm to said amplifier means, said voltages being of the same polarity such that the difference therebetween is applied to said amplifier means and amplified thereby to provide a first direct current output signal, said balance arm including signal converter means, effectively connected to said amplifier means and operable to convert the direct current output signal into a pulsating signal having a frequency that is proportional to the magnitude of the voltage developed across said unknown resistance, said converter means being also responsive to convert said pulsating signal into said voltage developed across said balance arm, said signal converter means having an equivalent resistance determined by the equation $R_P = 1/Cf$ where C is a value of known capacitance in said converter means and $f$ is the frequency of actuation of said converter means, said converter means being variably adjustably responsive to changes in said direct current output signal and said pulsating signal effective to provide said voltage developed across said balance arm with sufficient magnitude to balance said bridge circuit, said pulsating signal at the instant of balance of said bridge circuit having a frequency that is proportional to the magnitude of the unknown resistance according to the formula: $R_x = Kf$ where K is a constant determined by the ratio and branch arms of the bridge circuit and $f$ is the frequency of said converter means, and means for connecting said pulsating signal to indicator means operable to provide a digital count of the pulsations of said signal.

2. A digital instrument for measuring resistance as is defined in claim 1 and wherein the signal converter means includes first and second converter means, the first converter means being effectively connected to the amplifier means and operable to convert the direct current output signal into a pulsating signal, the second converter means being responsively connected to the first converter means and operable to convert the pulsating signal into the voltage developed across said balance arm.

3. A digital instrument as is defined in claim 1 and which includes circuit means for visually indicating an unbalance of the bridge circuit.

4. A digital instrument as is defined in claim 1 and wherein the source of voltage is connected to the bridge terminal that is defined by the junction of one of the ratio arms and the balance arm.

5. A digital instrument as is defined in claim 1 and wherein the amplifier means is connected by first connecting means to the bridge terminal that is defined by the junction of one of the ratio arms and the unknown resistance to be measured, and by second connecting means to the bridge terminal that is defined by the junction of the other of said ratio arms and the balance arm of the bridge.

6. A digital instrument as is defined in claim 1 and wherein the converter means includes capacitor means and switching means connected to said capacitor means, a source of voltage, and means for actuating said switching means alternately into two positions effective to charge and then discharge said capacitor means for developing the voltage across the balance arm of the bridge.

7. A digital instrument as is defined in claim 2 and wherein the second converter means includes capacitor means and switching means connected to said capacitor means, a source of voltage, means for actuating said switching means alternately into two positions, and said first converter means being operatively connected to said switching means and effective to cause said switching means to be actuated into a first of said two positions wherein said capacitor means is connected to said source of voltage and said first bridge terminal and charged thereby and to alternately actuate said switching means into the second of said two positions to cause said capacitor means to be connected across said switching means and to said first bridge terminal whereby to discharge thereacross and to define the voltage that is developed across the balance arm of the bridge.

References Cited
UNITED STATES PATENTS

| | | | |
|---|---|---|---|
| 2,972,106 | 2/1961 | Hyrne | 324—57 |
| 3,064,193 | 11/1962 | Grubb et al. | |
| 3,228,025 | 1/1966 | Welch | 340—347 |
| 3,302,106 | 1/1967 | Shaw | 324—62 |

EDWARD E. KUBASIEWICZ, Primary Examiner

U.S. Cl. X.R.

324—99